United States Patent
Strahs

(10) Patent No.: US 9,877,302 B2
(45) Date of Patent: *Jan. 23, 2018

(54) METHOD AND APPARATUS FOR DYNAMIC LOCATION-BASED MESSAGE NOTIFICATION

(71) Applicant: AT&T Intellectual Property I, L.P., Atlanta, GA (US)

(72) Inventor: Leopold Strahs, Williamsburg, VA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/243,603

(22) Filed: Aug. 22, 2016

(65) Prior Publication Data

US 2016/0360505 A1    Dec. 8, 2016

Related U.S. Application Data

(63) Continuation of application No. 14/658,864, filed on Mar. 16, 2015, now Pat. No. 9,426,617, which is a continuation of application No. 14/010,114, filed on Aug. 26, 2013, now Pat. No. 8,983,425, which is a continuation of application No. 11/958,232, filed on Dec. 17, 2007, now Pat. No. 8,521,127.

(51) Int. Cl.
| | |
|---|---|
| *H04M 11/04* | (2006.01) |
| *H04W 68/02* | (2009.01) |
| *H04W 4/02* | (2009.01) |
| *H04W 4/18* | (2009.01) |
| *H04W 4/22* | (2009.01) |
| *H04M 3/42* | (2006.01) |
| *H04L 29/08* | (2006.01) |

(52) U.S. Cl.
CPC ............ *H04W 68/02* (2013.01); *H04L 67/18* (2013.01); *H04W 4/02* (2013.01); *H04W 4/18* (2013.01); *H04W 4/22* (2013.01); *H04L 67/306* (2013.01); *H04M 3/42348* (2013.01)

(58) Field of Classification Search
CPC ......... H04W 4/22; H04W 4/023; H04W 4/20; H04W 88/02; H04W 4/18; H04W 72/10; H04W 72/1247; H04W 76/007; H04W 8/18; H04L 67/306; H04L 63/0428; H04L 63/105; H04L 41/0609; H04L 63/107; H04L 63/16
See application file for complete search history.

(56) References Cited

U.S. PATENT DOCUMENTS

| | | |
|---|---|---|
| 6,233,445 B1 | 5/2001 | Boltz et al. |
| 6,829,478 B1 | 12/2004 | Layton et al. |
| 6,888,811 B2 | 5/2005 | Eaton et al. |
| (Continued) | | |

OTHER PUBLICATIONS

Yet2.com, TechPak, :Innovative Software Platform for Delivery of Location-Based Services to Mobile Device http://www.yet2.com/app/app/utility/external/indextechpak/41495, retrieved from the internet on Dec. 4, 2007.

*Primary Examiner* — Nimesh Patel

(57) ABSTRACT

In one embodiment, the present invention is a method and apparatus for dynamic location-based message notification. In one embodiment, a method for providing alerts to a computing device includes identifying, via a set of location-specific computing resources, a current location of the computing device and sending at least one alert to the computing device, based on the current location.

20 Claims, 4 Drawing Sheets

(56) References Cited

U.S. PATENT DOCUMENTS

| | | | |
|---|---|---|---|
| 7,477,903 B2 | 1/2009 | Wilcock et al. | |
| 8,521,127 B2 | 8/2013 | Strahs | |
| 8,983,425 B2 | 3/2015 | Strahs | |
| 2002/0188522 A1 | 12/2002 | McCall et al. | |
| 2003/0137435 A1 | 7/2003 | Haddad et al. | |
| 2005/0043037 A1 | 2/2005 | Ioppe et al. | |
| 2005/0070247 A1 | 3/2005 | Larson et al. | |
| 2006/0194581 A1 | 8/2006 | Kang et al. | |
| 2007/0244981 A1 | 10/2007 | Malden et al. | |
| 2008/0217551 A1 | 9/2008 | Zhang et al. | |
| 2009/0131025 A1 | 5/2009 | Sharma et al. | |

| DEVICE ID | LOCATION | LAST UPDATE | WEATHER | TRAFFIC | AMBER ALERT | EMERGENCY | ... | ... |
|---|---|---|---|---|---|---|---|---|
| 212-555-1212 | OAKLAND, CALIF | 04:04 UTC | 6:00-20:00 | 8:00-18:00 | ANYTIME | ANYTIME | | |

METHOD AND APPARATUS FOR DYNAMIC LOCATION-BASED MESSAGE NOTIFICATION

This application is a continuation of U.S. patent application Ser. No. 14/658,864, filed Mar. 16, 2015, now U.S. Pat. No. 9,426,617, which is a continuation of U.S. patent application Ser. No. 14/010,114, filed Aug. 26, 2013, now U.S. Pat. No. 8,983,425, which is a continuation of U.S. patent application Ser. No. 11/958,232, filed Dec. 17, 2007, now U.S. Pat. No. 8,521,127, all of which are herein incorporated by reference in their entirety.

FIELD OF THE INVENTION

The present invention relates generally to mobile communications and relates more particularly to automated notification services.

BACKGROUND OF THE INVENTION

Automated emergency and other notification services are becoming increasingly popular with users of computing devices. For example, a user may subscribe to a notification service that sends weather alerts, homeland security alerts, missing children (amber) alerts, or other types of alerts to his or her mobile telephone or other device.

Typical notification services ask a user to identify the geographic area for which he or she desires notifications (identified, for example, by country, by city/state, or by zip code). One problem with such a system, however, is that once identified, the geographic area becomes static. Thus, these notifications may become irrelevant when the user travels outside of the specified geographic area. Moreover, the user may not receive relevant alerts for the geographic area within which he or she actually is.

Thus, there is a need in the art for a method and apparatus for dynamic location-based message notification.

SUMMARY OF THE INVENTION

In one embodiment, the present invention is a method and apparatus for dynamic location-based message notification. In one embodiment, a method for providing alerts to a computing device includes identifying, via a set of location-specific computing resources, a current location of the computing device and sending at least one alert to the computing device, based on the current location.

BRIEF DESCRIPTION OF THE DRAWINGS

The teaching of the present invention can be readily understood by considering the following detailed description in conjunction with the accompanying drawings, in which:

FIG. 2 illustrates an exemplary database entry in which device ID and user preferences are stored, so that a computing device user can receive the proper alerts on his or her computing device;

To facilitate understanding, identical reference numerals have been used, where possible, to designate identical elements that are common to the figures.

DETAILED DESCRIPTION

In one embodiment, the present invention is method and apparatus for dynamic location-based message notification. Embodiments of the present invention identify the current location of a user's computing device, and send notification messages to the computing device based on the current location.

Figure 1:
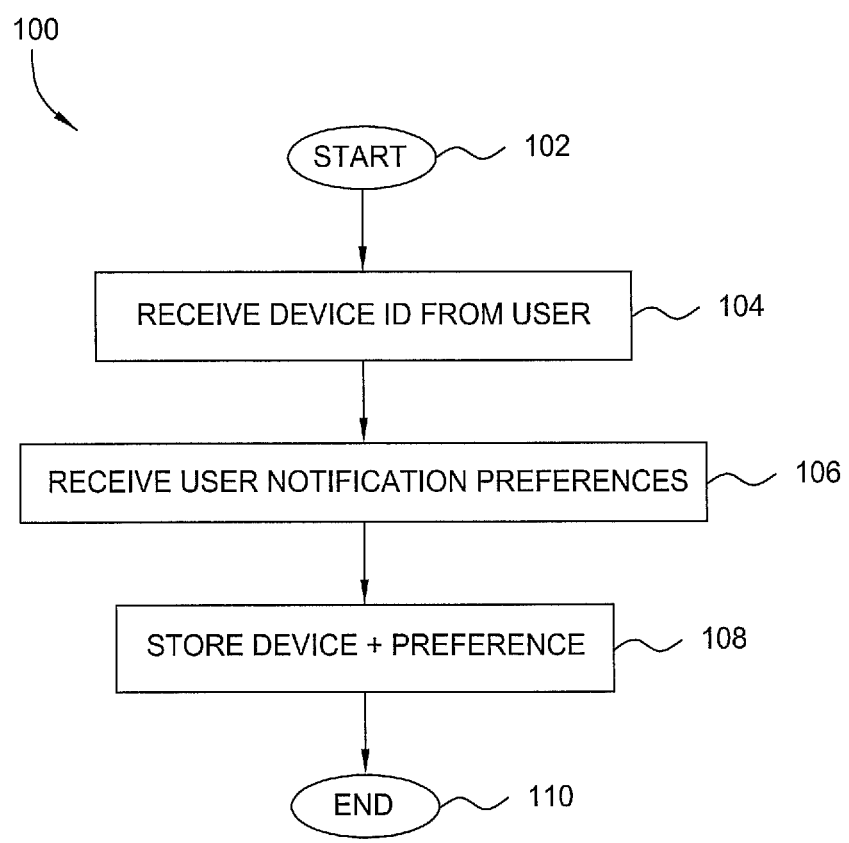
FIG. 1 is a flow diagram illustrating one embodiment of a method for registering a user for dynamic location-based message notification, according to the present invention.

FIG. 1 is a flow diagram illustrating one embodiment of a method 100 for registering a user for dynamic location-based message notification, according to the present invention. The method 100 is initialized at step 102 and proceeds to step 104, where the method 100 receives a device ID from a user. That is, the user identifies the computing device on which he or she wishes to receive notification messages. The device ID identifies the address (e.g., telephone number, email address, or the like) of the computing device. In one embodiment, the computing device is a desktop computer, a laptop computer, a mobile telephone, a pager, a reading tablet, an electronic book, a personal digital assistant (PDA), a game console, a handheld game device, a personal music/media player, or the like.

In step 106, the method 100 receives user notification preferences. That is, the user identifies the services for which he or she wishes to receive notification messages. For instance, if the user travels often, he or she may wish to subscribe to services that provide notifications for alerts relating to weather, traffic, airline flight statuses, or the like. In a further embodiment, the user also identifies the hours during which he or she wishes (or does not wish) to be notified. For instance, the user may not wish to receive traffic alerts at 3:00 AM.

In step 108, the method 100 stores the device ID and user preferences, so that the information can be used to send relevant notification messages to the user. FIG. 2, for example, illustrates an exemplary database entry 200 in which device ID and user preferences are stored, so that a computing device user can receive the proper alerts on his or her computing device. As illustrated, the database 200 may also include information related to the computing device's location, such as the computing device's current location and the time at which the current location was last updated.

The method 100 terminates in step 110.

Figure 3:
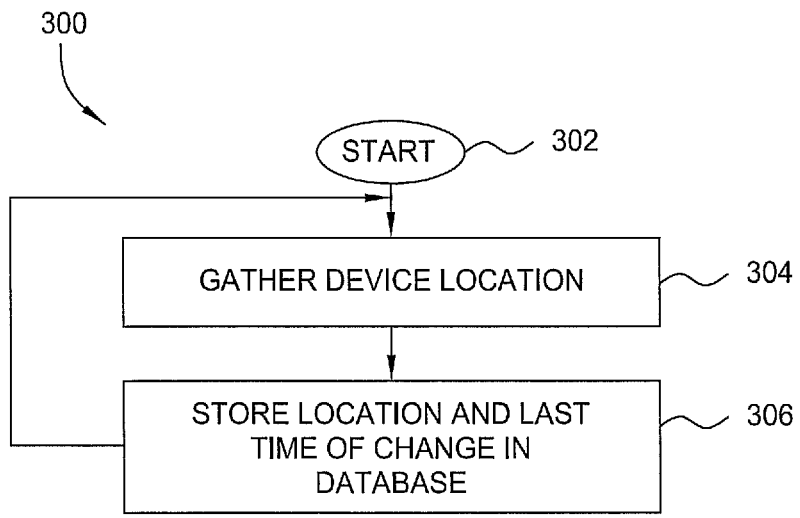
FIG. 3 is a flow diagram illustrating one embodiment of a method for dynamically updating the location of a computing device, according to the present invention.

FIG. 3 is a flow diagram illustrating one embodiment of a method 300 for dynamically updating the location of a computing device, according to the present invention.

The method 300 is initialized at step 302 and proceeds to step 304, where the method 300 identifies the current location of a computing device that is subscribed to one or more notification services. For example, the method 300 may identify in step 304 that the computing device is currently located in Orlando, Fla. In one embodiment (e.g., where the computing device is a mobile computing device such as a mobile telephone), the current location is identified in substantially the same manner that is used to guide 911 emergency calls (e.g., by measuring the timing of signals emitted from the computing device or via an internal global positioning system). In another embodiment (e.g., where the computing device is in communication via a Wi-Fi or static IP connection), the current location is identified by mapping the computing device's IP address to a service area.

In step 306, the method 300 stores the current location of the computing device (e.g., in a database, as described above). In one embodiment, the method 300 additionally stores the time at which the current location is updated/stored. The method 300 then returns to step 304 and proceeds as described above to monitor and update the current location of the computing device.

In one embodiment, a system for dynamically updating the location of a computing device and for providing dynamic message notification comprises a plurality of sets of computing resources distributed over a geographic area. For example, each zip code may include a separate set of location-specific computing resources dedicated to providing dynamic location-based messages to computing devices in that zip code. This facilitates scaling of the system. In one embodiment, such a system is facilitated by a mechanism that clears old information regarding the location of the computing device from the database. For instance, database entries for device location could expire when the entries reach a predefined age (e.g., based on the time that the device location was last updated). Expired database entries would be deleted, allowing the device location to be updated by the computing resources that support the device's current location.

Figure 4:
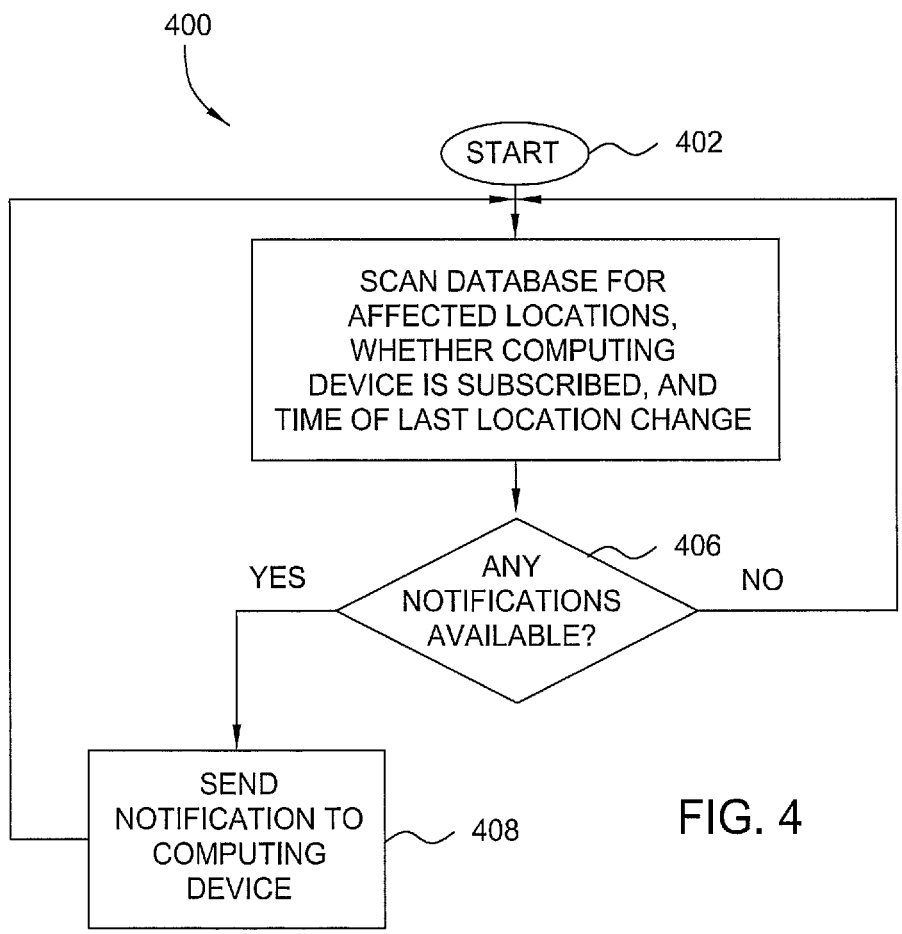
FIG. 4 is a flow diagram illustrating one embodiment of a method for providing dynamic location-based message notification, according to the present invention.

FIG. 4 is a flow diagram illustrating one embodiment of a method 400 for providing dynamic location-based message notification, according to the present invention. The method 400 is initialized at step 402 and proceeds to step 404, where the method 400 scans a database for locations affected by notifications, as well as for whether a given computing device is subscribed to one or more notification services and the time at which the current location of the computing device was last updated. For example, the method 400 may check a database such as that illustrated in FIG. 2.

In step 406, the method 400 determines whether there are any notifications available for any of the services to which the computing device is subscribed, based on the computing device's current location. For example, the computing device's current location may be recorded as Orlando, Fla., and the method 400 may determine that the computing device is subscribed to a notification service that provides weather alerts. In this case, a notification currently available for the Orlando, Fla. area warning of thunderstorms may be considered pertinent.

If the method 400 concludes in step 406 that there is at least one notification available based on the computing device's current location, the method 400 proceeds to step 408 and sends a notification message to the computing device before returning to step 404 and continuing to scan the database.

Alternatively, if the method 400 concludes in step 406 that there are no notifications available based on the computing device's current location, the method 400 simply returns to step 404 and continues to scan the database.

In one embodiment, the frequency with which the method 400 checks for notifications is programmable (e.g., by a network provider). For instance, in one embodiment, the method 400 operates on a periodic or ad hoc schedule (e.g., check for notifications every x minutes). In another embodiment, the method 400 is configured to provide notifications substantially immediately (e.g., substantially as soon as the notifications are received by the method 400). Immediate notifications may be desirable, for instance, in the case of amber alerts.

Although the present invention is described within the context of a subscription-based notification service (i.e., wherein the user specifies the types of notification messages that he or she wishes to receive), the concepts of the present invention may also be applied to emergency notification services in which no subscription may be necessary. For example, a tornado alert could be sent to all active mobile telephones that are currently within the area in which the tornado is expected to land.

Figure 5:
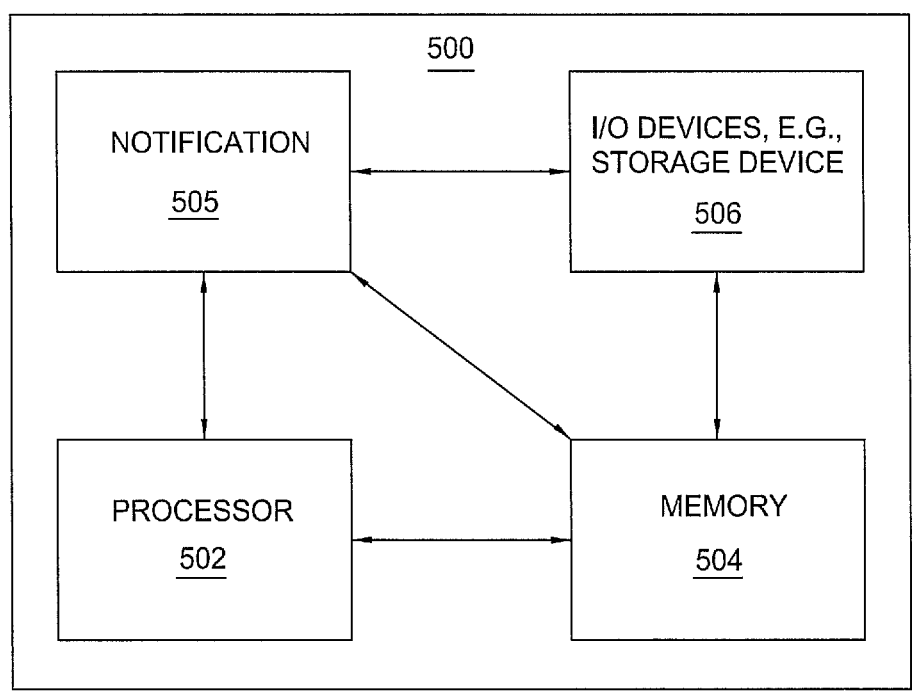
FIG. 5 is a high level block diagram of the dynamic location-based message notification method that is implemented using a general purpose computing device.

FIG. 5 is a high level block diagram of the dynamic location-based message notification method that is implemented using a general purpose computing device 500. In one embodiment, a general purpose computing device 500 comprises a processor 502, a memory 504, a notification module 505 and various input/output (I/O) devices 506 such as a display, a keyboard, a mouse, a modem, and the like. In one embodiment, at least one I/O device is a storage device (e.g., a disk drive, an optical disk drive, a floppy disk drive). It should be understood that the notification module 505 can be implemented as a physical device or subsystem that is coupled to a processor through a communication channel.

Alternatively, the notification module 505 can be represented by one or more software applications (or even a combination of software and hardware, e.g., using Application Specific Integrated Circuits (ASIC)), where the software is loaded from a storage medium (e.g., I/O devices 506) and operated by the processor 502 in the memory 504 of the general purpose computing device 500. Thus, in one embodiment, the notification module 505 for sending dynamic location-based notification messages described herein with reference to the preceding Figures can be stored on a computer readable medium or carrier (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing an alert to a computing device, the method comprising:

identifying, via a location-specific computing resource, a current location of the computing device, wherein the location-specific computing resource is one of a plurality of location-specific computing resources, wherein the location-specific computing resource is dedicated to a specific location, wherein the location-specific computing resource is external to the computing device, wherein the identifying comprises updating the current location of the computing device by the location-specific computing resource; and sending, by the location-specific computing resource, the alert to the computing device when a current time falls within a daily time period during which a user of the computing device has authorized notification of a class of alerts within which the alert falls, wherein the alert relates to a scheduled transportation status alert, wherein the user has subscribed to a plurality of classes of alerts including the class of alerts within which the alert falls, and wherein the daily time period for receiving a notification of the class of alerts is separately configurable by the user from another daily time period for receiving a notification of another one of the plurality of classes of alerts.

2. The method of claim 1, wherein the identifying comprises:
measuring a timing of a signal emitted from the computing device.

3. The method of claim 1, wherein the identifying is performed using a global positioning system.

4. The method of claim 1, wherein the identifying comprises:
mapping an internet protocol address of the computing device to a service area.

5. The method of claim 1, wherein the sending comprises:
checking a notification service to which the computing device is subscribed; and
determining whether the notification service has the alert available for the current location.

6. The method of claim 1, wherein the computing device is a mobile telephone.

7. The method of claim 1, wherein the scheduled transportation status alert comprises an airline flight status alert.

8. A non-transitory computer readable medium containing an executable program for providing an alert to a computing device, where the executable program, when executed by a processor of a location-specific computing resource, causes the processor to perform operations, the operations comprising:
identifying a current location of the computing device, wherein the location-specific computing resource is one of a plurality of location-specific computing resources, wherein the location-specific computing resource is dedicated to a specific location, wherein the location-specific computing resource is external to the computing device, wherein the identifying comprises updating the current location of the computing device by the location-specific computing resource; and
sending the alert to the computing device when a current time falls within a daily time period during which a user of the computing device has authorized notification of a class of alerts within which the alert falls, wherein the alert relates to a scheduled transportation status alert, wherein the user has subscribed to a plurality of classes of alerts including the class of alerts within which the alert falls, and wherein the daily time period for receiving a notification of the class of alerts is separately configurable by the user from another daily time period for receiving a notification of another one of the plurality of classes of alerts.

9. The non-transitory computer readable medium of claim 8, wherein the identifying comprises:
measuring a timing of a signal emitted from the computing device.

10. The non-transitory computer readable medium of claim 8, wherein the identifying is performed using a global positioning system.

11. The non-transitory computer readable medium of claim 8, wherein the identifying comprises:
mapping an internet protocol address of the computing device to a service area.

12. The non-transitory computer readable medium of claim 9, wherein the sending comprises:
checking a notification service to which the computing device is subscribed; and
determining whether the notification service has the alert available for the current location.

13. The non-transitory computer readable medium of claim 8, wherein the computing device is a mobile telephone.

14. The non-transitory computer readable medium of claim 8, wherein the scheduled transportation status alert comprises an airline flight status alert.

15. A method comprising:
sending, by a processor of a mobile computing device, a device identification for which a user wishes to receive an alert;
sending, by the processor, a notification preference as to the alert; and
receiving, by the processor, the alert when a current time falls within a daily time period during which a user of the mobile computing device has authorized notification of a class of alerts within which the alert falls in accordance with the notification preference as to the alert, wherein the user has subscribed to a plurality of classes of alerts including the class of alerts within which the alert falls, and wherein the daily time period for receiving a notification of the class of alerts is separately configurable by the user from another daily time period for receiving a notification of another one of the plurality of classes of alerts.

16. The method of claim 15, wherein the mobile computing device is a mobile telephone.

17. The method of claim 15, wherein the alert comprises a scheduled transportation status alert.

18. The method of claim 17, wherein the scheduled transportation status alert comprises an airline flight status alert.

19. The method of claim 15, wherein the alert comprises an amber alert.

20. The method of claim 15, wherein the alert comprises a traffic alert.

* * * * *